United States Patent
Reshef

(10) Patent No.: US 11,912,300 B2
(45) Date of Patent: Feb. 27, 2024

(54) BEHAVIORAL PLANNING IN AUTONOMUS VEHICLE

(71) Applicant: GM Global Technology Operations LLC, Detroit, MI (US)

(72) Inventor: Roi Reshef, Herzliya (IL)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 102 days.

(21) Appl. No.: 17/038,063

(22) Filed: Sep. 30, 2020

(65) Prior Publication Data

US 2022/0097727 A1  Mar. 31, 2022

(51) Int. Cl.
  *B60W 60/00* (2020.01)
  *G06N 20/00* (2019.01)
  (Continued)

(52) U.S. Cl.
  CPC ........ *B60W 60/0011* (2020.02); *B60W 10/04* (2013.01); *B60W 10/18* (2013.01);
  (Continued)

(58) Field of Classification Search
  CPC .. B60W 60/0011; B60W 10/04; B60W 10/18; B60W 10/20; B60W 2420/42;
  (Continued)

(56) References Cited

U.S. PATENT DOCUMENTS

| | | | |
|---|---|---|---|
| 2005/0192749 A1 | 9/2005 | Flann et al. | |
| 2014/0244114 A1* | 8/2014 | Matsubara | B60W 30/0956 701/41 |

(Continued)

FOREIGN PATENT DOCUMENTS

| | | |
|---|---|---|
| CN | 109375632 A | 2/2019 |
| CN | 109964188 A | 7/2019 |

(Continued)

OTHER PUBLICATIONS

Shalev-Shwartz et al., "Safe, Multi-Agent Reinforcement Learning for Autonomous Driving", Proc. NIPS Workshop Learn, Inference Control Multi-Agent Syst., 2016, pp. 1-13.

(Continued)

*Primary Examiner* — James J Lee
*Assistant Examiner* — Alexander George Matta
(74) *Attorney, Agent, or Firm* — CANTOR COLBURN LLP

(57) ABSTRACT

Systems and methods to perform behavioral planning in an autonomous vehicle from a reference state involve generating a set of actions of a fixed size and fixed order according to a predefined methodology. Each action is a semantic instruction for a next motion of the vehicle. A set of trajectories is generated from the set of actions as an instruction indicating a path and a velocity profile to generate steering angles and accelerations for implementation by the vehicle. A trajectory filter is applied to filter the set of trajectories such that unfiltered trajectories are candidate trajectories. Applying the trajectory filter includes assessing the path and velocity profile indicated by each of the set of trajectories. A selected trajectory is used to control the vehicle or the action that corresponds to the selected trajectory is used in trajectory planning to generate a final trajectory that is used to control the vehicle.

14 Claims, 4 Drawing Sheets

(51) Int. Cl.
  *B60W 10/20* (2006.01)
  *B60W 10/04* (2006.01)
  *G01C 21/34* (2006.01)
  *B60W 10/18* (2012.01)

(52) U.S. Cl.
  CPC ......... *B60W 10/20* (2013.01); *G01C 21/3453* (2013.01); *G06N 20/00* (2019.01); *B60W 2420/403* (2013.01); *B60W 2420/408* (2024.01); *B60W 2520/00* (2013.01)

(58) Field of Classification Search
  CPC ......... B60W 2420/52; B60W 2520/00; B60W 2050/0052; B60W 2710/207; B60W 2720/103; B60W 2720/106; G01C 21/3453; G06N 20/00
  See application file for complete search history.

(56) References Cited

U.S. PATENT DOCUMENTS

| | | | |
|---|---|---|---|
| 2015/0046078 A1* | 2/2015 | Biess | G08G 1/163 701/301 |
| 2020/0082248 A1* | 3/2020 | Villegas | B60W 40/02 |
| 2020/0089245 A1 | 3/2020 | Yadmellat et al. | |
| 2020/0110414 A1* | 4/2020 | Dupre | B60W 60/0011 |
| 2020/0269843 A1* | 8/2020 | Wissing | B60W 30/18163 |
| 2020/0276988 A1* | 9/2020 | Graves | B60W 60/0016 |
| 2020/0307568 A1* | 10/2020 | Takahashi | B60R 11/04 |
| 2021/0312177 A1* | 10/2021 | Bansal | G06V 10/82 |

FOREIGN PATENT DOCUMENTS

| | | |
|---|---|---|
| CN | 109976355 A | 7/2019 |
| CN | 110271556 A | 9/2019 |
| KR | 20180131154 A | 12/2018 |
| WO | 2019166517 A1 | 9/2019 |
| WO | 2020001700 A1 | 1/2020 |
| WO | 2020052587 A1 | 3/2020 |

OTHER PUBLICATIONS

Werling et al., "Optimal Trajectory Generation for Dynamic Street Scenarios in a Frenet Frame", 2010 IEEE International Conference on Robotics and Automation, pp. 987-993.

Chinese Office Action for Chinese Application 2021105041703, dated Dec. 27, 2023; 3 pages.

* cited by examiner

BEHAVIORAL PLANNING IN AUTONOMUS VEHICLE

INTRODUCTION

The subject disclosure relates to behavioral planning in an autonomous vehicle.

Autonomous vehicles (e.g., automobiles, trucks, constructions equipment, farm equipment, automated factory equipment) use sensors to obtain information about the vehicle and its environment. This information is used along with mapping and locating information to guide the vehicle from a starting point to a destination without driver intervention. Even after a route (or set of potential routes) is determined from the starting point to the destination, behavioral planning and trajectory planning must be undertaken for medium-term (e.g., tens of seconds) and short-term (e.g., 3-4 seconds) durations continuously throughout the trip. Behavioral planning refers to planning an action (i.e., semantic instructions such as "turn left" or "come to a stop") that the vehicle should take. Trajectory planning refers to planning a path and velocity profile corresponding to an action that is selected as part of the behavioral planning. The trajectory is used to generate the commands (e.g., steering angle, acceleration/deceleration) that are implemented in the vehicle to follow the trajectory and take the corresponding action. Accordingly, it is desirable to provide behavioral planning in an autonomous vehicle.

SUMMARY

In one exemplary embodiment, a method of performing behavioral planning in an autonomous vehicle from a reference state, including location and orientation, includes generating a set of actions of a fixed size and fixed order according to a predefined methodology. Each action in the set of actions being a semantic instruction for a next motion of the vehicle. The method also includes generating a set of trajectories from the set of actions. Each trajectory in the set of trajectories being a vehicle-implementable instruction indicating a path and a velocity profile to a controller to generate steering angles and accelerations or decelerations to be implemented by the vehicle. A trajectory filter is applied to filter the set of trajectories such that unfiltered trajectories among the set of trajectories are candidate trajectories, the applying the trajectory filter including assessing the path and the velocity profile indicated by each of the set of trajectories. A selected trajectory among the candidate trajectories is used to control the vehicle or the action among the set of actions that corresponds to the selected trajectory is used in trajectory planning to generate a final trajectory that is used to control the vehicle.

In addition to one or more of the features described herein, the method also includes applying an action filter to filter the set of actions prior to the generating the set of trajectories such that the generating the set of trajectories includes generating a trajectory corresponding with each action in the set of actions that is not filtered by the action filter.

In addition to one or more of the features described herein, the applying the action filter includes identifying actions among the set of actions that are inapplicable based on the reference state of the vehicle.

In addition to one or more of the features described herein, the applying the action filter includes masking rather than removing filtered actions among the set of actions such that the fixed size and the fixed order of the set of actions is maintained.

In addition to one or more of the features described herein, the applying the trajectory filter includes masking rather than removing filtered trajectories among the set of trajectories such that the fixed size and the fixed order of the set of actions is maintained.

In addition to one or more of the features described herein, the generating the set of actions includes generating seven basic dynamic actions corresponding with nine cells, a center cell among the nine cells being the reference state of the vehicle and another eight cells among the nine cells surrounding the center cell, and generating three basic fixed actions corresponding with three lanes, a lane of the reference state of the vehicle and lanes on either side of the lane of the reference state of the vehicle.

In addition to one or more of the features described herein, the generating the set of actions includes generating M dynamic actions from each of the seven basic dynamic actions and generating M*K fixed actions from each of the three basic fixed actions, M is a predefined number of urgency levels and K is a predefined number of terminal velocities.

In addition to one or more of the features described herein, the generating the set of trajectories includes determining, for each trajectory among the set of trajectories, an optimal time duration T* by optimizing a cost function generated from the action among the set of actions corresponding to the trajectory, the cost function including weights that are predefined according to the urgency level among the predefined number of urgency levels of the action.

In addition to one or more of the features described herein, the generating the trajectories includes using the optimal time duration T* and boundary conditions that define a lateral and longitudinal position and velocity for the reference state of the vehicle and a resulting state of the vehicle associated with the corresponding action.

In addition to one or more of the features described herein, the reference state indicates a true location and orientation of the vehicle or a virtual location and orientation of the vehicle based on a previously determined candidate trajectory.

In another exemplary embodiment, a system to control an autonomous vehicle includes one or more sensors configured to determine a state of the vehicle, the state including location and orientation, and a controller. The controller generates a set of actions of a fixed size and fixed order according to a predefined methodology. Each action in the set of actions being a semantic instruction for a next motion of the vehicle. The controller also generates a set of trajectories from the set of actions. Each trajectory in the set of trajectories being a vehicle-implementable instruction indicating a path and a velocity profile to a controller to generate steering angles and accelerations or decelerations to be implemented by the vehicle. A trajectory filter is applied to filter the set of trajectories such that unfiltered trajectories among the set of trajectories are candidate trajectories. Applying the trajectory filter including assessing the path and the velocity profile indicated by each of the set of trajectories. A selected trajectory among the candidate trajectories is used to control the vehicle or the action among the set of actions that corresponds to the selected trajectory is used in trajectory planning to generate a final trajectory that is used to control the vehicle.

In addition to one or more of the features described herein, the one or more sensors includes an inertial measurement unit, radar system, camera, or lidar system.

In addition to one or more of the features described herein, the controller applies an action filter to filter the set of actions prior to the generating the set of trajectories such that generating the set of trajectories includes generating a trajectory corresponding with each action in the set of actions that is not filtered by the action filter.

In addition to one or more of the features described herein, the controller applies the action filter by identifying actions among the set of actions that are inapplicable based on the state of the vehicle.

In addition to one or more of the features described herein, the controller applies the action filter by masking rather than removing filtered actions among the set of actions such that the fixed size and the fixed order of the set of actions is maintained.

In addition to one or more of the features described herein, the controller applies the trajectory filter by masking rather than removing filtered trajectories among the set of trajectories such that the fixed size and the fixed order of the set of actions is maintained.

In addition to one or more of the features described herein, the controller generates the set of actions by generating seven basic dynamic actions corresponding with nine cells, a center cell among the nine cells being the state of the vehicle and another eight cells among the nine cells surrounding the center cell, and generating three basic fixed actions corresponding with three lanes, a lane of the state of the vehicle and lanes on either side of the lane of the state of the vehicle.

In addition to one or more of the features described herein, the controller generates the set of actions by generating M dynamic actions from each of the seven basic dynamic actions and generating M*K fixed actions from each of the three basic fixed actions, M is a predefined number of urgency levels and K is a predefined number of terminal velocities.

In addition to one or more of the features described herein, the controller generates the set of trajectories by determining, for each trajectory among the set of trajectories, an optimal time duration T* by optimizing a cost function generated from the action among the set of actions corresponding to the trajectory, the cost function including weights that are predefined according to the urgency level among the predefined number of urgency levels of the action.

In addition to one or more of the features described herein, the controller generates the trajectories by using the optimal time duration T* and boundary conditions that define a lateral and longitudinal position and velocity for the state of the vehicle and a resulting state of the vehicle associated with the corresponding action.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
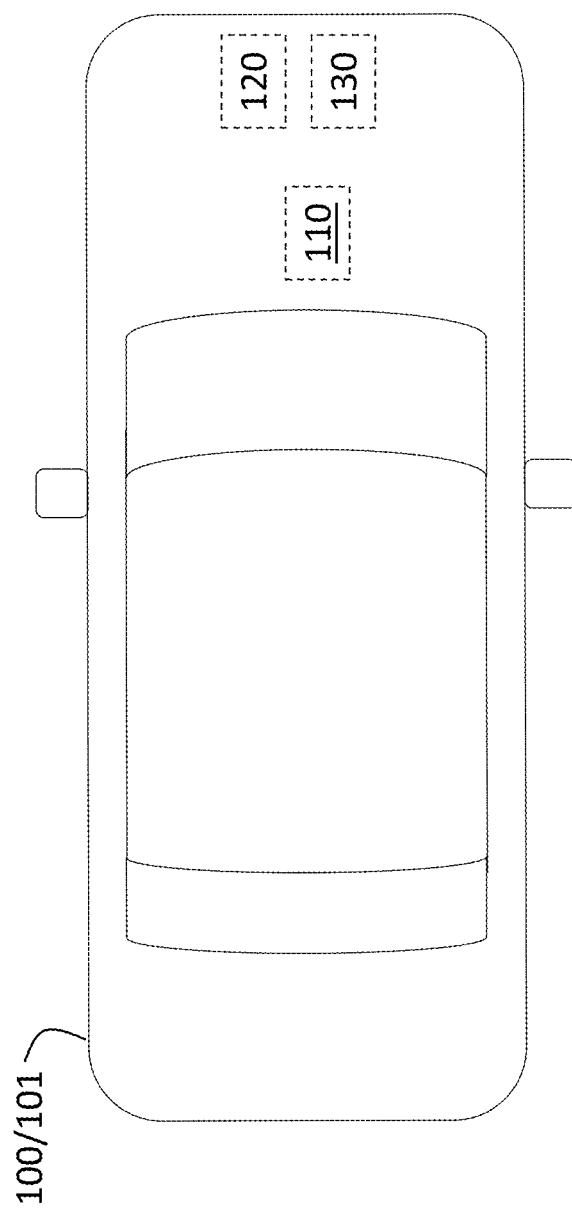
FIG. 1 is a block diagram of a vehicle that implements trajectory planning in an autonomous driving mode according to one or more embodiments.

The following description is merely exemplary in nature and is not intended to limit the present disclosure, its application or uses. It should be understood that throughout the drawings, corresponding reference numerals indicate like or corresponding parts and features.

As previously noted, route selection from a given starting point to an intended destination is not sufficient by itself to guide an autonomous vehicle to the destination. All along the route, behavioral planning and trajectory planning is performed to ultimately determine the actual control that must be executed (e.g., the steering and acceleration and deceleration (i.e., gas and brake)). This is akin to the control conventionally performed by a human driver. While the human driver may use sight and hearing to make the judgments that result in each movement of the steering wheel and gas or brake pedal, the autonomous vehicle uses sensors to make similar judgments. The selection of the next action that should be taken by the vehicle (i.e., behavioral planning) from any given state along a route is sequential. That is, different actions lead to different states and, thus, a prior action affects the selection of a future action.

Embodiments of the systems and methods detailed herein relate to behavioral planning in an autonomous vehicle. As detailed, from a given present state (e.g., location, orientation) of the vehicle, the behavioral planning according to one or more embodiments begins with generating a set of potential actions and includes generating a set of potential trajectories corresponding to at least a subset of the potential actions. One among the set of actions may be selected based on evaluating the set of potential trajectories. A decision tree is an exemplary way to select among the set of trajectories, thereby facilitating selection of the corresponding action. According to alternate embodiments, other approaches (e.g., a rule-based approach, utility-based approach, machine learning methods) may be used for selection after the set of trajectories is generated according to one or more embodiments. Once an action is selected via evaluation of the set of potential trajectories, the selected trajectory may be used. According to this exemplary embodiment, trajectory planning is completed as part of the behavioral planning. Alternatively, subsequent trajectory planning may be undertaken for the selected action to refine the trajectory corresponding to the action, which will ultimately lead to the commands implemented to control operation of the vehicle. As previously noted, this process is repeated sequentially throughout the route.

In accordance with an exemplary embodiment, FIG. 1 is a block diagram of a vehicle 100 that implements behavioral planning in an autonomous driving mode. The exemplary vehicle 100 shown in FIG. 1 is an automobile 101. The vehicle 100 includes a controller 110 that facilitates the autonomous operation based on information from sensors 120 that provide information about the vehicle 100 itself (e.g., inertial measurement unit, accelerometer) and sensors 130 (e.g., camera, radar system, lidar system) that provide information about the environment around the vehicle 100. The numbers and locations of the sensors 120, 130 are not limited by the exemplary illustration in FIG. 1. The controller 110 may determine the state of the vehicle 100 based on the sensors 120, 130 and may perform the behavioral planning, as detailed herein according to one or more embodiments.

As previously noted, this behavioral planning may preclude subsequent trajectory planning according to an exemplary embodiment. According to an alternate embodiment, the controller 110 may also perform subsequent trajectory planning for the corresponding action that is selected according to the behavioral planning. The trajectory that results from trajectory planning (or which corresponds with the action in the course of the behavioral planning) is an instruction that the controller 110 uses to generate steering angles and accelerations/decelerations, to achieve the planned trajectory and perform the corresponding action. The controller 110 includes processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
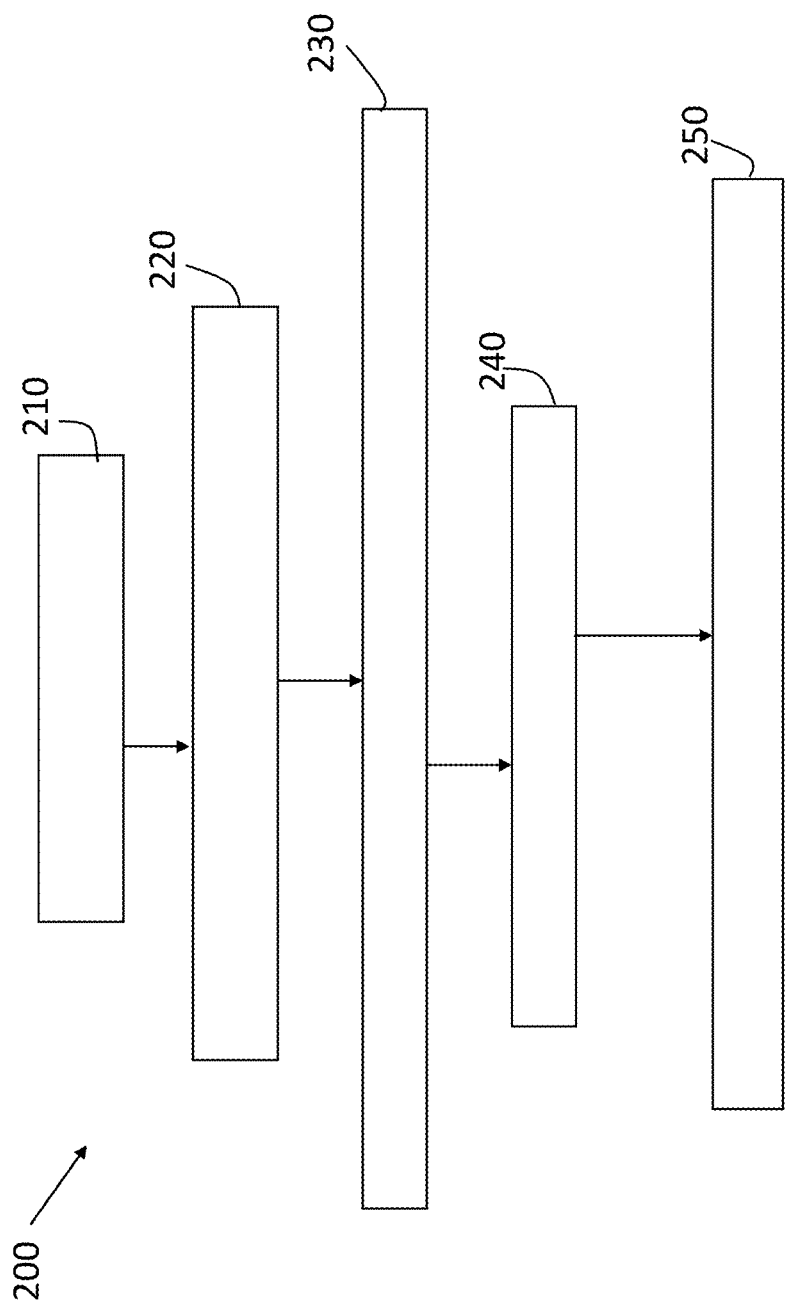
FIG. 2 is a process flow of a method of generating a set of candidate trajectories for consideration in trajectory planning according to one or more embodiments.

FIG. 2 is a process flow of a method 200 of performing behavioral planning according to one or more embodiments. According to an exemplary embodiment, the processes of the method 200 are performed once at a given state of the vehicle 100. In this case, the set of candidate trajectories that is obtained (at block 250) is evaluated and one trajectory is selected based on the evaluation. The action (among the set of actions generated at block 210) that corresponds with the selected trajectory is the result of the behavioral planning at the given state. According to another exemplary embodiment (e.g., for use with a decision tree approach), the processes of the method 200 are performed iteratively at a given state of the vehicle 100. In this case, each of the initial set of candidate trajectories generated for the given state gives rise to a set of virtual states of the vehicle (i.e., states that would be realized if the corresponding trajectories were implemented) at a next level. Each of these virtual states is then used to generate another set of trajectories and so on for a selected number of levels. The selection among the initial set of candidate trajectories involves all the levels in this case.

At block 210, generating a set of actions is performed according to a methodology that is detailed with reference to FIG. 3. As previously noted, an action refers to a semantic instruction (e.g., "move to left lane," "keep straight," "come to stop") while a trajectory specifies a path and velocity profile that may be achieved through vehicle-implementable instructions that specify steering angle and acceleration or deceleration to control operation of the vehicle 100. Not every action that is generated (at block 210) according to the methodology is applicable to the state (e.g., location, orientation) of the vehicle 100 or its environment. The state may refer to the true state of the vehicle 100 or to a virtual state of the vehicle 100 according to alternate embodiments.

At block 220, the processes include filtering inapplicable actions from the set of actions generated at block 210. For example, "move to left lane" may be among the set of actions that is generated at block 210, but there may not be a lane to the left of the lane in which the vehicle 100 is located according to its true or virtual state, thereby rendering the action inapplicable. The filtering at block 220 may rely on information from sensors 130, for example. Inapplicable actions are further discussed with reference to FIG. 3, as well.

At block 230, generating trajectories from the remaining set of actions following the filtering (at block 220) uses an optimal time duration T* that is further discussed with reference to FIG. 4. Filtering at block 220 may refer to indicating as invalid or masking inapplicable actions rather than removing inapplicable actions from the set generated at block 210. That is, the set of actions generated at block 210 may be a fixed size and fixed order vector according to exemplary embodiments. This fixed size and fixed order may be maintained at the subsequent processes of the method 200 by masking entries that are filtered out (at blocks 220 and 240) rather than deleting them. According to exemplary embodiments, when multiple levels of trajectories are generated according to the processes of the method 200, the fixed size and fixed order vector may be maintained across the levels (i.e., at the true and virtual states). This may prove advantageous when a machine learning approach is used for selection of a trajectory as part of behavioral planning according to an exemplary embodiment.

The fixed size and fixed order vector is also why actions may be generated (at block 210) that are not even applicable to the current (true or virtual) state of the vehicle 100. The first filter, at block 220, prevents using time and resources of the controller 110 to generate trajectories (at block 230) that are not feasible anyway. Once the trajectories are generated (at block 230) for actions that were not filtered out (at block 220), a second filter is applied at block 240.

At block 240, filtering impermissible trajectories refers to filtering based on kinematics, safety, comfort or other considerations that cannot be evaluated for the corresponding actions. The ability to filter according to these additional criteria is one of the reasons that trajectories are generated in the behavioral planning according to one or more embodiments. Evaluating these considerations with regard to actions would be less accurate. The higher level of abstraction for actions in comparison to trajectories means that the considerations of the filter at block 240 require generation of the trajectories (at block 230). The filtering at block 240 is further discussed along with trajectory generation (at block 230) in the discussion of FIG. 4.

At block 250, obtaining a set of candidate trajectories to consider refers to treating the unfiltered trajectories as feasible trajectories. As previously noted, according to an exemplary embodiment, these feasible trajectories may be associated with the true state of the vehicle 100. In that case, further evaluation results in selection of one of the feasible trajectories. The selected feasible trajectory may be used to generate commands for implementation by the vehicle 100. In this case, the trajectory planning is performed as a part of the behavioral planning according to an exemplary embodiment. According to an alternate embodiment, the action corresponding with the selected feasible trajectory is used to perform trajectory planning. This trajectory planning may result in a more refined trajectory than the selected feasible trajectory being implemented by the vehicle 100. As also previously noted, according to another exemplary embodiment, these feasible trajectories may be evaluated (e.g., in a decision tree approach) with other feasible trajectories at different levels to ultimately select one of the feasible trajectories for the true state of the vehicle 100.

Figure 3:
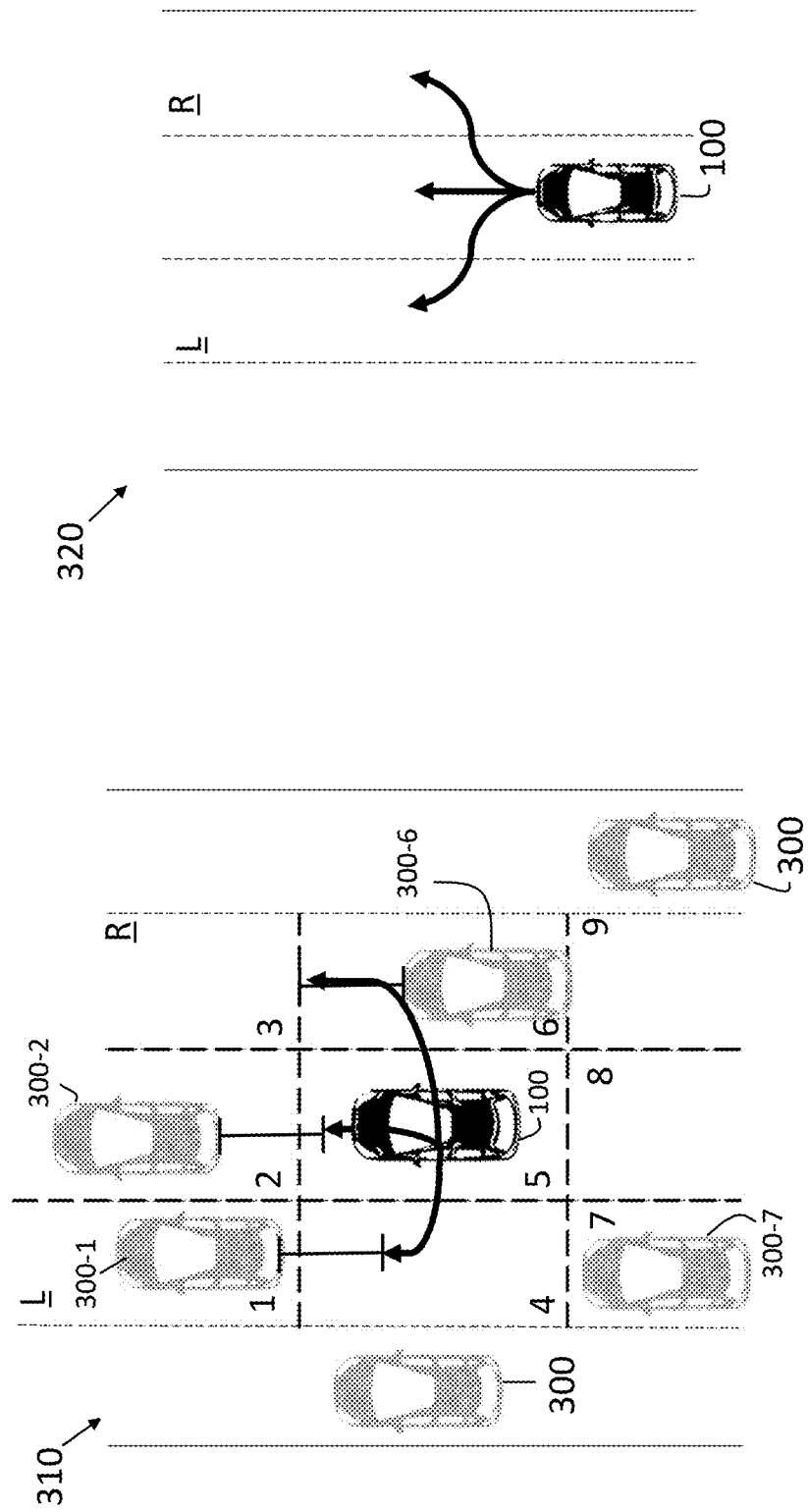
FIG. 3 illustrates exemplary scenarios to explain the methodology used to generate the set of actions.

FIG. 3 illustrates exemplary scenarios 310, 320 to explain the methodology used to generate the set of actions at block 210 of FIG. 2. The scenario 310 illustrates dynamic actions that make up the set of actions while the scenario 320 illustrates fixed actions that make up the set of actions. The dynamic actions involve other vehicles 300. In the exemplary scenario 310, cell numbers 1-9 are assigned to locations around the vehicle 100, as indicated. Also indicated are the right lane R and the left L relative to the vehicle 100. Other vehicles 300-1, 300-2, 300-6, and 300-7 in the numbered cells are labeled according to the cell number assigned to their location. Other vehicles 300 that are not in any of the cells are not considered in generating the dynamic actions. The vehicle 100 is in the center at cell 5, as shown.

For each of the cells (i.e., cells 1-4 and 6-9) that surround the center cell (i.e., cell 5), which is the true or virtual location of the vehicle 100, an action is generated to move the vehicle 100 to a predefined semantic pose (i.e., position and orientation) relative to the closest other vehicle 300 in the cell. This other vehicle 300 is referred to as the representative vehicle for the cell. For example, the other vehicle 300-1 is the representative vehicle of cell 1. For example, the predefined semantic pose associated with each of the cells 1-4 and 6-9 may be behind the representative vehicle of the cell. Thus, for example, the semantic pose specific to cell 1 is "get to specified headway behind the representative vehicle of cell 1." This results in a dynamic action that includes a lane change to the left and a subsequent state (which is a virtual state at this stage) at the representative vehicle's velocity and a location at a specified longitudinal distance behind the representative vehicle.

Specifically, according to an exemplary embodiment, six conditions are defined for a given dynamic action, although an abbreviated description (e.g., "move to left lane") is generally used herein for brevity. These six conditions of the dynamic action result in the specified semantic pose. As previously noted, the exemplary semantic pose used herein for explanatory purposes is a specified headway (i.e., temporal space) behind a particular representative vehicle. The six conditions that define a given action are lateral position, lateral velocity, lateral acceleration, longitudinal position, longitudinal velocity, and longitudinal acceleration.

The lateral position to be achieved by the dynamic action is the center of the relevant lane (i.e., the lane of the representative vehicle). The lateral velocity and the lateral acceleration at the end of every dynamic action are 0. That is, even if a lane change was required, all lateral movement ceases when the vehicle 100 has moved to the headway position behind the representative vehicle. While the longitudinal position and longitudinal velocity differ according to the semantic pose (e.g., move to left lane or right lane), the dynamic action always ends with a longitudinal acceleration of 0. That is, once the position specified by the semantic pose (e.g., headway behind a representative vehicle) is reached, the vehicle 100 does not accelerate but, instead, matches the longitudinal velocity of the representative vehicle.

Continuing the discussion of exemplary dynamic actions, according to the exemplary semantic pose, the dynamic action associated with cell 3 would be generated based on "get to a specified headway behind the representative vehicle of cell 3." Because there is no other vehicle 300 in cell 3, the dynamic action including a move to the right lane (i.e., toward cell 3) will be filtered out at block 220 as an inapplicable action. As previously noted, the filtering at block 220 may rely on information from sensors 130, for example. The information from sensors 130 may indicate the lanes that are present as well as other vehicles 300.

The dynamic action associated with cell 8, may be generated based on the exemplary semantic pose "get to a specified headway behind the representative vehicle of cell 8" and then filtered (at block 220) because, even if there were another vehicle 300-8 in cell 8, the action of moving backward and behind that other vehicle 300-8 would be inapplicable. Alternately, a dynamic action may not be generated (at block 210) with respect to cell 8 at all. This alternative is assumed in Table 1 below. Similarly, the exemplary semantic pose is inapplicable to the cell in which the vehicle 100 already resides. Thus, a dynamic action may be generated (at block 220) with respect to cell 5, the location of the vehicle 100, and filtered (at block 220) or, alternately, no dynamic action may be generated (at block 210) for cell 5, as is assumed in Table 1. In the exemplary scenario 310, only the dynamic actions associated with cells 1, 2, 6, and 7 will not be filtered at block 220.

In other scenarios, most of the dynamic actions may be filtered (at block 220) as inapplicable. For example, if the true or virtual location of the vehicle 100 is on a single-lane road such that there is no right lane R or left lane L (i.e., cells 1, 3, 4, 6, 7, and 9 are not roadways), then only the action associated with cell 2 would be unfiltered at block 220 since the dynamic actions associated with cells 5 and 8 are always filtered, as well, if generated at all. Regardless of any subsequent filtering at block 220, at block 210, dynamic actions are generated for the seven cells 1-4, 6, 7, and 9 surrounding the vehicle 100. Thus, in all, seven basic dynamic actions are generated.

Table 1 indicates the basic dynamic action associated with each cell. Each of these basic dynamic actions may be repeated with a number M of different levels of urgency or aggressiveness. M is predefined and the urgency is expressed as weighting pairs, as discussed with reference to FIG. 4. That is, each of the M urgency levels is associated with a predefined weighting pair $w_J$, $w_T$ that is used in the processes associated with block 230. For example, M=3. In that case, the dynamic actions with regard to cell 1 may be "move to left lane L and get behind vehicle in cell 1 with urgency level 1," "move to left lane L and get behind vehicle in cell 1 with urgency level 2," and "move to left lane L and get behind vehicle in cell 1 with urgency level 3." Thus, a total of M*7 dynamic actions is generated.

TABLE 1

Basic dynamic actions

| cell number | dynamic action |
|---|---|
| 1 | move to left lane L and get behind vehicle in cell 1 |
| 2 | stay in lane behind vehicle in cell 2 |
| 3 | move to right lane R and get behind vehicle in cell 3 |
| 4 | move to left lane L and get behind vehicle in cell 4 |
| 6 | move to right lane R and get behind vehicle in cell 6 |
| 7 | move to left lane L and get behind vehicle in cell 7 |
| 9 | move to right lane R and get behind vehicle in cell 9 |

As previously noted, the scenario 320 illustrates fixed actions. The right lane R and the left lane L relative to the vehicle 100 are indicated. Fixed actions refer to those that do not consider any other vehicles 300. The three basic fixed actions are "move to left lane L," "stay in lane," and "move to right lane R," according to an abbreviated description. More specifically, according to an exemplary embodiment, five conditions are defined for each fixed action (i.e., for the state achieved through the action). The five conditions are lateral position, lateral velocity, lateral acceleration, longitudinal velocity, and longitudinal acceleration. The longitudinal position (e.g., position within the lane) is unconstrained, but the longitudinal velocity is specified by the terminal velocity, which is the velocity of the vehicle 100 at the state in which the fixed action ends, and longitudinal acceleration is 0. If the left lane L and/or the right lane R is not present for a given real or virtual location of the vehicle 100, then the fixed action associated with that lane will be filtered out at block 220.

For each of the basic fixed actions, K different terminal velocities may be considered. That is, the basic fixed action of "move to left lane L" may be expanded to K fixed actions of "move to left lane L and reach one of the K terminal velocities." The K terminal velocities are predefined and may be selected to be evenly spaced within a range of terminal velocities. For example, four (i.e., K=10) terminal velocities in the range 0 to 30 miles per hour (mph) may be 0, 10 mph, 20 mph, and 30 mph. Alternatively, the K terminal velocities may be relative to a static metric associated with the current (true or virtual) state of the vehicle 100 such as the speed limit. In addition, like the dynamic actions discussed with reference to the exemplary scenario 310, the fixed actions may each be performed with M levels of urgency. Thus, a total of M*(K*3) fixed actions is generated.

Together, the M*7 dynamic actions and M*(K*3) fixed actions result in M*(7+(K*3)) actions as the set of actions. As previously noted, this number of actions and the order of the actions may be fixed. The order may be each of the dynamic actions by cell number followed by each of the fixed actions as one example. According to exemplary embodiments, the size and order of the actions generated at block 210 is maintained throughout the processes shown in FIG. 2. Thus, the filtered actions resulting from block 220 are a same size vector as the actions generated at block 210 and are in the same order, but the filtered actions are masked, for example. Similarly, the trajectories generated at block 230 are a same size vector as the actions generated at block 210 and are in the same order. That is, all the unmasked actions (resulting from block 220) have corresponding trajectories (resulting from block 230) within a total vector size and in the same order as the actions generated at block 210.

Figure 4:
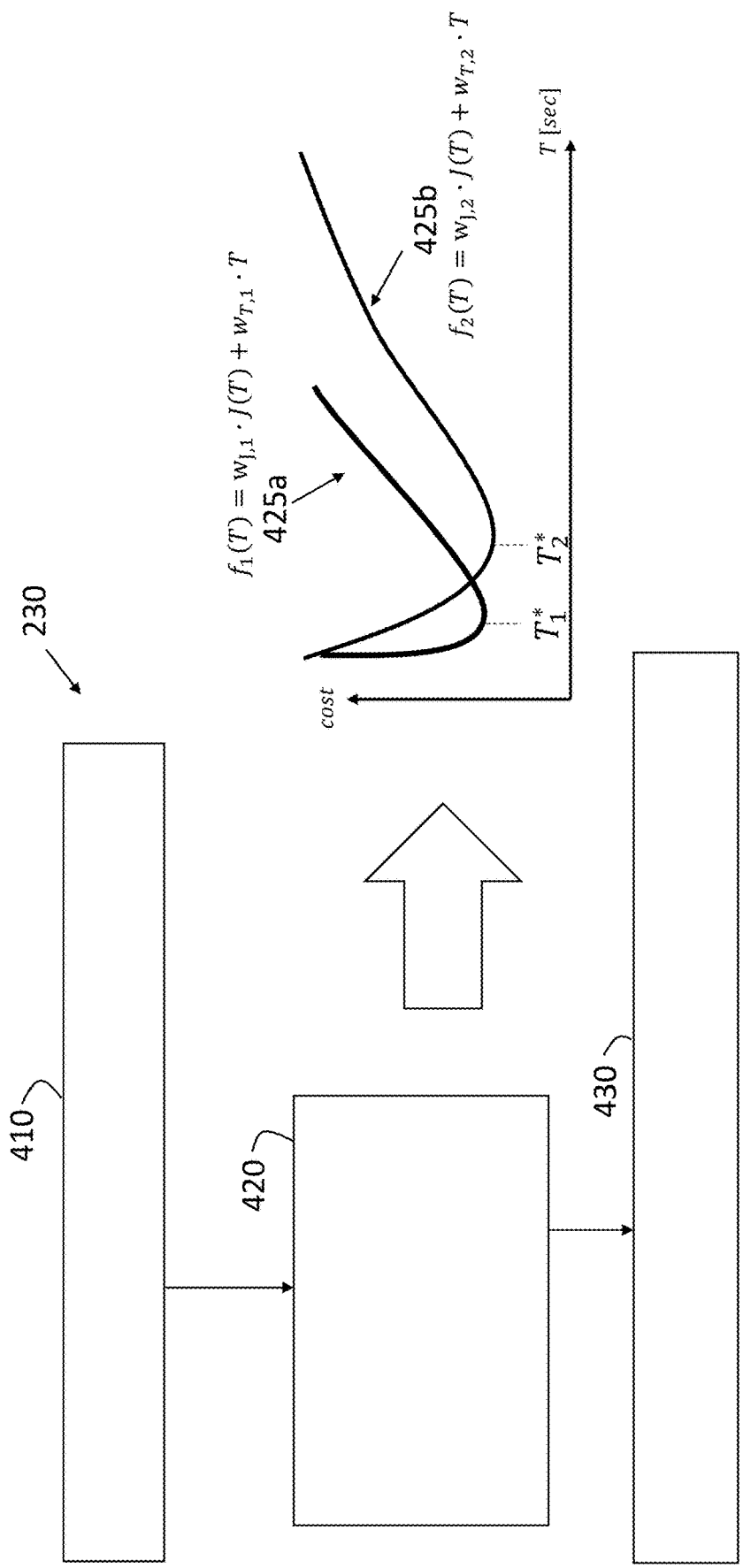
FIG. 4 is a process flow detailing aspects of determining an optimal time duration T* as part of the process of generating trajectories according to one or more embodiments.

FIG. 4 is a process flow detailing the aspects of determining an optimal time duration T* as part of generating trajectories at block 230 of FIG. 2, according to one or more embodiments. Trajectory planning, which refers to generating a trajectory (i.e., a specification of a path and a velocity profile) corresponding with an action (i.e., a semantic instruction), is generally known and may be implemented according to a number of different approaches. According to an exemplary embodiment, the trajectory planning approach that is employed at block 230 to generate a trajectory corresponding with each action that was not filtered out at block 220 is referred to as jerk-optimal trajectory planning. Advantageously, embodiments detailed herein differ from prior trajectory planning approaches by determining the optimal time duration T* for each trajectory.

The fact that one type of trajectory planning (e.g., jerk-optimal trajectory planning) is used at block 230 is why trajectory planning by one or more other approaches may subsequently be performed according to alternate embodiments. That is, as previously noted, one of the actions generated at block 210 is selected by evaluating and selecting from among the feasible trajectories that result from the processing at block 240 and then determining the action that corresponds with the selected feasible trajectory. According to one exemplary embodiment, the selected feasible trajectory may be implemented to control the vehicle 100. However, according to an exemplary embodiment, trajectory planning may be undertaken again for the selected action. This subsequent trajectory planning would likely use a different approach than the approach used at block 230 (e.g., jerk-optimal trajectory planning).

According to one or more embodiments detailed herein, an optimal time duration T* is determined for the trajectory and is used additionally in an exemplary jerk-optimal trajectory planning process at block 230. For a given action (e.g., move into left lane), it is intuitively apparent that fast action and passenger comfort are inversely related. That is, a high jerk (i.e., change in acceleration over time) corresponds to a small time duration to perform an action (with relatively lower passenger comfort) while a long time duration to perform the action corresponds to low jerk and, consequently, higher passenger comfort. A cost function is solved, at block 420, to determine the optimal time duration T* for the trajectory to balance jerk and time duration.

At block 410, obtaining boundary conditions and the urgency level of a given action refers to obtaining this information for one of the actions (not filtered at block 220) at a time. The processes shown in FIG. 4 are performed for each action that passes the filter at block 220 in order to generate the corresponding trajectory at block 230. The boundary conditions indicate the current (real or virtual) state of the vehicle 100 and terminal state (i.e., where the vehicle 100 is and where it will be based on the action). Specifically, a lateral and longitudinal position and velocity at the start and end states, which are among the conditions specified for both the dynamic actions and the fixed actions, are obtained. The urgency level is among the M urgency levels ascribed to each base action.

At block 420, the processes include solving a cost function to determine the optimal time duration T* for the trajectory to be generated. In FIG. 4, two graphs 425a, 425b respectively illustrate cost versus time T in seconds (sec) for two exemplary cost functions $f_1(T)$ and $f_2(T)$ associated with two different actions. The graph 425a may relate to an action such as "come to a stop," for example, while the graph 425b may relate to a different exemplary action (e.g., "move to right lane and reach a terminal velocity"). The optimal time duration T* for the trajectory corresponding with each action is determined by minimizing the applicable cost function.

Specifically, the cost function $f_1(T)$ is minimized to determine the optimal time duration $T_1^*$ for the trajectory corresponding with the first exemplary action and the cost function $f_2(T)$ is minimized to determine the optimal time duration $T_2^*$ for the trajectory corresponding with the second exemplary action. In each of the cost functions, J(T) is a function that maps the boundary conditions and a time for execution T to the accumulated sum of squared jerk over a jerk-optimal trajectory solution to the boundary conditions. The weight $w_J$ of the jerk component and the weight $w_T$ of the time component are predefined for each of the M urgency levels. Stated another way, a given urgency level among the M urgency levels affects the trajectory that is generated for an action by affecting the weights $w_J$ and $w_T$. Thus, the weights $w_{J,1}$ and $w_{T,1}$ used in the cost function $f_1(T)$ will actually have the same values as the weights $w_{J,2}$ and $w_{T,2}$ used in the cost function $f_2(T)$ if the urgency level associated with the action that generated the cost function $f_1(T)$ is the same as the urgency level associated with the action that generated the cost function $f_2(T)$.

At block 430, generating the trajectory corresponding with a given action (i.e., performing trajectory planning) will use not only the boundary conditions defined by the action but also the optimal time duration T* according to one or more embodiments. The trajectory planning itself, according to a jerk-optimal approach, for example, is known. Once the processes at block 230 are performed for every action that is not filtered out at block 220, the resulting trajectories are filtered at block 240 to identify the feasible trajectories, as noted with reference to FIG. 2. Because a given trajectory indicates a path and a velocity profile, the filtering at block 240 may consider kinematics, safety, comfort, and other factors that are predefined. For example, if the velocity profile exceeds a speed limit associated with the current (real or virtual) state of the vehicle 100, the trajectory specifying that velocity profile may be filtered at block 240. Thresholds may be predefined for the velocity profile in consideration of passenger safety or comfort, as well.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of performing behavioral planning in an autonomous vehicle from a reference state, including location and orientation, the method comprising:
    generating a set of actions of a fixed size and fixed order according to a predefined methodology, each action in the set of actions being a semantic instruction for a next motion of the vehicle;
    applying an action filter to filter the set of actions, wherein the applying the action filter includes identifying the semantic instructions among the set of actions that are not applicable based on the reference state of the vehicle such that all applicable actions of the set of actions are among the unfiltered actions;
    generating a set of trajectories from the unfiltered actions in the set of actions, each trajectory in the set of trajectories being a vehicle-implementable instruction indicating a path and a velocity profile to a controller to generate steering angles and accelerations or decelerations to be implemented by the vehicle, wherein the applying the action filter is prior to the generating the set of trajectories such that the generating the set of trajectories includes generating a trajectory corresponding with each unfiltered action in the set of actions that is not filtered by the action filter; and
    applying a trajectory filter to filter the set of trajectories such that unfiltered trajectories among the set of trajectories are a plurality of candidate trajectories, wherein the applying the trajectory filter includes masking rather than removing filtered trajectories among the set of trajectories such that the fixed size and the fixed order of the set of actions is maintained, the applying the trajectory filter including assessing the path and the velocity profile indicated by each of the set of trajectories, and selecting a trajectory among the plurality of candidate trajectories, the selected trajectory used to control the vehicle or the action among the set of actions that corresponds to the selected trajectory is used in trajectory planning to generate a final trajectory that is used to control the vehicle.

2. The method according to claim 1, wherein the applying the action filter includes masking rather than removing filtered actions among the set of actions such that the fixed size and the fixed order of the set of actions is maintained.

3. The method according to claim 1, wherein the generating the set of actions includes generating seven basic dynamic actions corresponding with nine cells, a center cell among the nine cells being the reference state of the vehicle and another eight cells among the nine cells surrounding the center cell, and generating three basic fixed actions corresponding with three lanes, a lane of the reference state of the vehicle and lanes on either side of the lane of the reference state of the vehicle.

4. The method according to claim 3, wherein the generating the set of actions includes generating M dynamic actions from each of the seven basic dynamic actions and generating M*K fixed actions from each of the three basic fixed actions, M is a predefined number of urgency levels and K is a predefined number of terminal velocities.

5. The method according to claim 4, wherein the generating the set of trajectories includes determining, for each trajectory among the set of trajectories, an optimal time duration T* by optimizing a cost function generated from the action among the set of actions corresponding to the trajectory, the cost function including weights that are predefined according to the urgency level among the predefined number of urgency levels of the action.

6. The method according to claim 5, wherein the generating the trajectories includes using the optimal time duration T* and boundary conditions that define a lateral and longitudinal position and velocity for the reference state of the vehicle and a resulting state of the vehicle associated with the corresponding action.

7. The method according to claim 1, wherein the reference state indicates a true location and orientation of the vehicle or a virtual location and orientation of the vehicle based on a previously determined candidate trajectory.

8. A system to control an autonomous vehicle, the system comprising:
    one or more sensors configured to determine a state of the vehicle, the state including location and orientation; and
    a controller configured to:
    generate a set of actions of a fixed size and fixed order according to a predefined methodology, each action in the set of actions being a semantic instruction for a next motion of the vehicle,
    apply an action filter to filter the set of actions, wherein the controller is configured to apply the action filter by identifying the semantic instructions among the set of actions that are not applicable based on the reference state of the vehicle such that all applicable actions of the set of actions are among the unfiltered actions;
    generate a set of trajectories from the unfiltered actions in the set of actions, each trajectory in the set of trajectories being a vehicle-implementable instruction indicating a path and a velocity profile to a controller to generate steering angles and accelerations or decelerations to be implemented by the vehicle, wherein the action filter is applied prior to generating the set of trajectories such that the generating the set of trajectories includes generating a trajectory corresponding with each unfiltered action in the set of actions that is not filtered by the action filter, and
    apply a trajectory filter to filter the set of trajectories such that unfiltered trajectories among the set of trajectories are a plurality of candidate trajectories, wherein the trajectory filter is applied by masking rather than removing filtered trajectories among the set of trajectories such that the fixed size and the fixed order of the set of actions is maintained, the applying the trajectory filter including assessing the path and the velocity profile indicated by each of the set of trajectories, selecting a trajectory among the plurality of candidate trajectories, wherein the selected trajectory among the candidate trajectories is used to control the vehicle or the action among the set of actions that corresponds to the selected trajectory is used in trajectory planning to generate a final trajectory that is used to control the vehicle.

9. The system according to claim 8, wherein the one or more sensors includes an inertial measurement unit, radar system, camera, or lidar system.

10. The system according to claim 8, wherein the controller is configured to apply the action filter by masking rather than removing filtered actions among the set of actions such that the fixed size and the fixed order of the set of actions is maintained.

11. The system according to claim 8, wherein the controller is configured to generate the set of actions by generating seven basic dynamic actions corresponding with nine cells, a center cell among the nine cells being the state of the vehicle and another eight cells among the nine cells surrounding the center cell, and generating three basic fixed actions corresponding with three lanes, a lane of the state of the vehicle and lanes on either side of the lane of the state of the vehicle.

12. The system according to claim 11, wherein the controller is configured to generate the set of actions by generating M dynamic actions from each of the seven basic dynamic actions and generating M*K fixed actions from each of the three basic fixed actions, M is a predefined number of urgency levels and K is a predefined number of terminal velocities.

13. The system according to claim 12, wherein the controller is configured to generate the set of trajectories by determining, for each trajectory among the set of trajectories, an optimal time duration T* by optimizing a cost function generated from the action among the set of actions corresponding to the trajectory, the cost function including weights that are predefined according to the urgency level among the predefined number of urgency levels of the action.

14. The system according to claim 13, wherein the controller is configured to generate the trajectories by using the optimal time duration T* and boundary conditions that define a lateral and longitudinal position and velocity for the state of the vehicle and a resulting state of the vehicle associated with the corresponding action.

* * * * *